(12) United States Patent
Jester

(10) Patent No.: US 9,084,413 B1
(45) Date of Patent: Jul. 21, 2015

(54) SPRING-LOADED CURLED TIP HAND TOOL FOR USE IN UNTANGLING FISHING LINE

(71) Applicant: David A. Jester, Lexington, SC (US)

(72) Inventor: David A. Jester, Lexington, SC (US)

(*) Notice: Subject to any disclaimer, the term of this patent is extended or adjusted under 35 U.S.C. 154(b) by 214 days.

(21) Appl. No.: 13/868,167

(22) Filed: Apr. 23, 2013

(51) Int. Cl.
*A01K 97/00* (2006.01)

(52) U.S. Cl.
CPC ...................... *A01K 97/00* (2013.01)

(58) Field of Classification Search
CPC ....... A01K 85/08; A01K 91/04; A01K 97/00; A01K 97/14; A01K 97/24; A01K 97/26; A01K 97/28
See application file for complete search history.

(56) References Cited

U.S. PATENT DOCUMENTS

| | | | | |
|---|---|---|---|---|
| 3,401,967 | A * | 9/1968 | Glowka | 289/17 |
| 3,402,957 | A * | 9/1968 | Peterson | 289/17 |
| 3,419,924 | A * | 1/1969 | Archibald | 7/106 |
| 3,575,449 | A * | 4/1971 | Browning | 289/1.5 |
| 4,077,618 | A * | 3/1978 | Durant | 269/130 |
| 4,660,314 | A * | 4/1987 | Janssen et al. | 289/17 |
| 4,765,082 | A * | 8/1988 | Nicholas | 289/17 |
| 4,961,439 | A * | 10/1990 | Hartmann | 132/212 |
| 5,251,797 | A * | 10/1993 | Martin | 223/99 |
| 5,878,522 | A * | 3/1999 | Thedford | 43/1 |
| 5,951,067 | A * | 9/1999 | High | 289/17 |
| 6,026,607 | A * | 2/2000 | Bukowski | 43/4 |
| 6,293,601 | B1 * | 9/2001 | Johnson | 294/26 |
| 6,550,177 | B1 * | 4/2003 | Epple, Jr. | 43/4 |
| D683,812 | S * | 6/2013 | Atkinson | D22/149 |
| 2004/0004355 | A1 * | 1/2004 | Beers | 289/17 |
| 2007/0053180 | A1 * | 3/2007 | Jones et al. | 362/118 |
| 2010/0156100 | A1 * | 6/2010 | Goldsmith | 289/1.5 |

OTHER PUBLICATIONS http://www.staples.com/Zebra-F-301-Stainless-Steel-Retractable-Ballpoint-Pens-Fine-Point-Black-2/product_270975 Dated Oct. 31, 2011 via https://archive.org/web/.*

* cited by examiner

*Primary Examiner* — Shaun R Hurley
(74) *Attorney, Agent, or Firm* — Kyle A. Fletcher, Esq.

(57) ABSTRACT

The spring-loaded curled tip hand tool for use in untangling fishing line includes a curled tip tool that is uniquely designed for use in untangling a fishing line or otherwise manipulating said fishing line. The curled tip tool extends from and retracts into a hollowed shaft via a spring-loaded button that is positioned at a distal end of the shaft. The shaft may be further defined with a conical tip that is made of a clear material and which includes a lighting member therein. The lighting member is able to project light down the curled tip tool when the device is in use in a poorly or low lit environment. The shaft is held in order to articulate the curled tip tool.

10 Claims, 3 Drawing Sheets

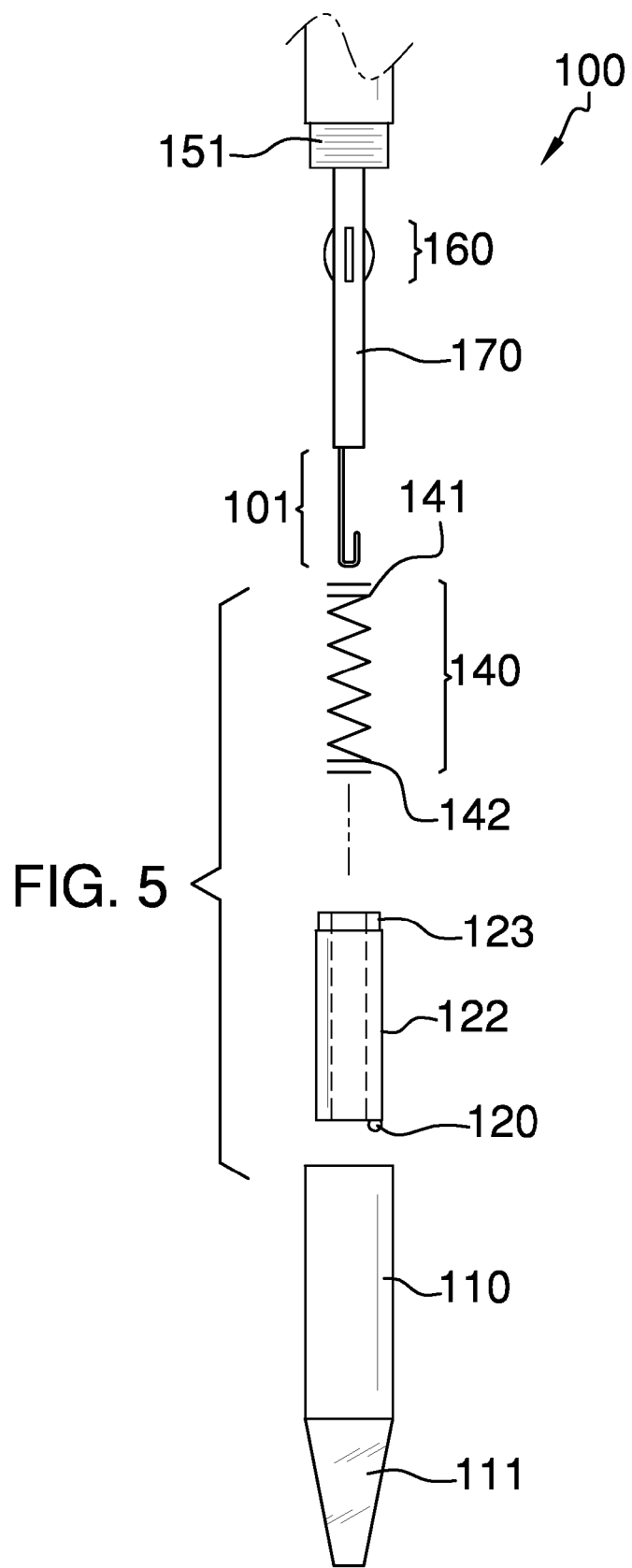

SPRING-LOADED CURLED TIP HAND TOOL FOR USE IN UNTANGLING FISHING LINE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of fishing tools, more specifically, a hand-held tool that is specially designed to aid in untangling fishing line.

B. Discussion of the Prior Art

As will be discussed immediately below, no prior art discloses a curled tip tool that is uniquely designed for use in untangling a fishing line or otherwise manipulating said fishing line; wherein the curled tip tool extends from and retracts into a hollowed shaft via a spring-loaded button that is positioned at a distal end of the shaft; wherein the shaft may be further defined with a conical tip that is made of a clear material and which includes a lighting member therein; wherein the lighting member is able to project light down the curled tip tool when the shaft is held in order to articulate the curled tip tool.

The Johnston Patent (U.S. Pat. No. 7,261,327) discloses a fishing hook tying apparatus that includes a housing with a shaft mounted therein for rotation about the longitudinal axis. However, the apparatus does not provide a fishing line detangling tool that extends from and retracts inside of a cylindrical housing via a spring-loaded member.

The High Patent (U.S. Pat. No. 5,791,699) discloses a knot tying device that includes a hollow, elongated body member with a coil expansion spring-mounted tubular piston therein and a release thereon. However, the knot tying device is not a curled tip tool having the shape and function of a device that untangles a fishing line.

The Milton Patent (U.S. Pat. No. 6,434,878) discloses a fish hook holder comprising a cylindrical shape barrel having a plunger inserted therein that is resiliently biased by a spring also residing with the barrel. Again, the fish hook holder is not able to untangle a fishing line.

The Stromberg Patent (U.S. Pat. No. 3,625,556) discloses a fishing line looper. However, the looper is not illuminated nor extended or retracted from a shaft.

The Allen Patent (U.S. Pat. No. 3,965,605) discloses a fishhook tying device including a handle, a spring clamp, and a threading device. However, the device is not illuminated nor being able to retract and extend from the handle.

The Gouldie et al. Patent (U.S. Pat. No. 5,735,071) discloses a pen-shaped fishing accessory that comprises a tool assembly having a fishhook baiter on one end and a fishing line cutter on an opposite end.

The Adams et al. Patent (U.S. Pat. No. Des. 385,009) illustrates an ornamental design for a tool for untangling backlashed fishing line.

While the above-described devices fulfill their respective and particular objects and requirements, they do not describe a curled tip tool that is uniquely designed for use in untangling a fishing line or otherwise manipulating said fishing line; wherein the curled tip tool extends from and retracts into a hollowed shaft via a spring-loaded button that is positioned at a distal end of the shaft; wherein the shaft may be further defined with a conical tip that is made of a clear material and which includes a lighting member therein; wherein the lighting member is able to project light down the curled tip tool when the device is in use in a poorly or low lit environment; wherein the shaft is held in order to articulate the curled tip tool. In this regard, the spring-loaded curled tip hand tool for use in untangling fishing line departs from the conventional concepts and designs of the prior art.

SUMMARY OF THE INVENTION

The spring-loaded curled tip hand tool for use in untangling fishing line includes a curled tip tool that is uniquely designed for use in untangling a fishing line or otherwise manipulating said fishing line. The curled tip tool extends from and retracts into a hollowed shaft via a spring-loaded button that is positioned at a distal end of the shaft. The shaft may be further defined with a conical tip that is made of a clear material and which includes a lighting member therein. The lighting member is able to project light down the curled tip tool when the device is in use in a poorly or low lit environment. The shaft is held in order to articulate the curled tip tool.

It is an object of the invention to provide a hand-held tool that untangles a knotted or tangled fishing line.

A further object of the invention is to provide a shaft into which a curled tip tool is able to extend from or retract inside.

An even further object of the invention is to provide a lighting member that is able to project light down the curled tip tool in order to illuminate the fishing line when in use in a dark or poorly lit environment.

These together with additional objects, features and advantages of the spring-loaded curled tip hand tool for use in untangling fishing line will be readily apparent to those of ordinary skill in the art upon reading the following detailed description of presently preferred, but nonetheless illustrative, embodiments of the spring-loaded curled tip hand tool for use in untangling fishing line when taken in conjunction with the accompanying drawings.

In this respect, before explaining the current embodiments of the spring-loaded curled tip hand tool for use in untangling fishing line in detail, it is to be understood that the spring-loaded curled tip hand tool for use in untangling fishing line is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the spring-loaded curled tip hand tool for use in untangling fishing line.

It is therefore important that the claims be regarded as including such equivalent construction insofar as they do not depart from the spirit and scope of the spring-loaded curled tip hand tool for use in untangling fishing line. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 5 illustrates an exploded view of the componentry associated with the spring-loaded curled tip hand tool.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
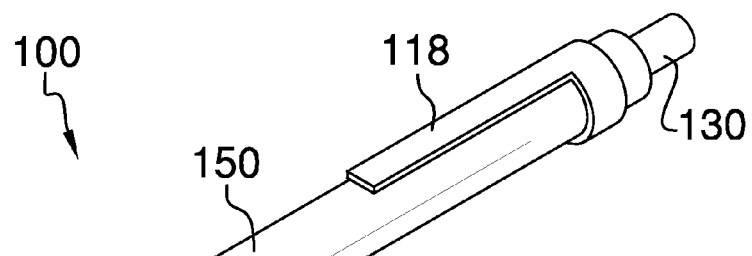
FIG. 1 illustrates a perspective view of the spring-loaded curled tip hand tool by itself.
Figure 2:
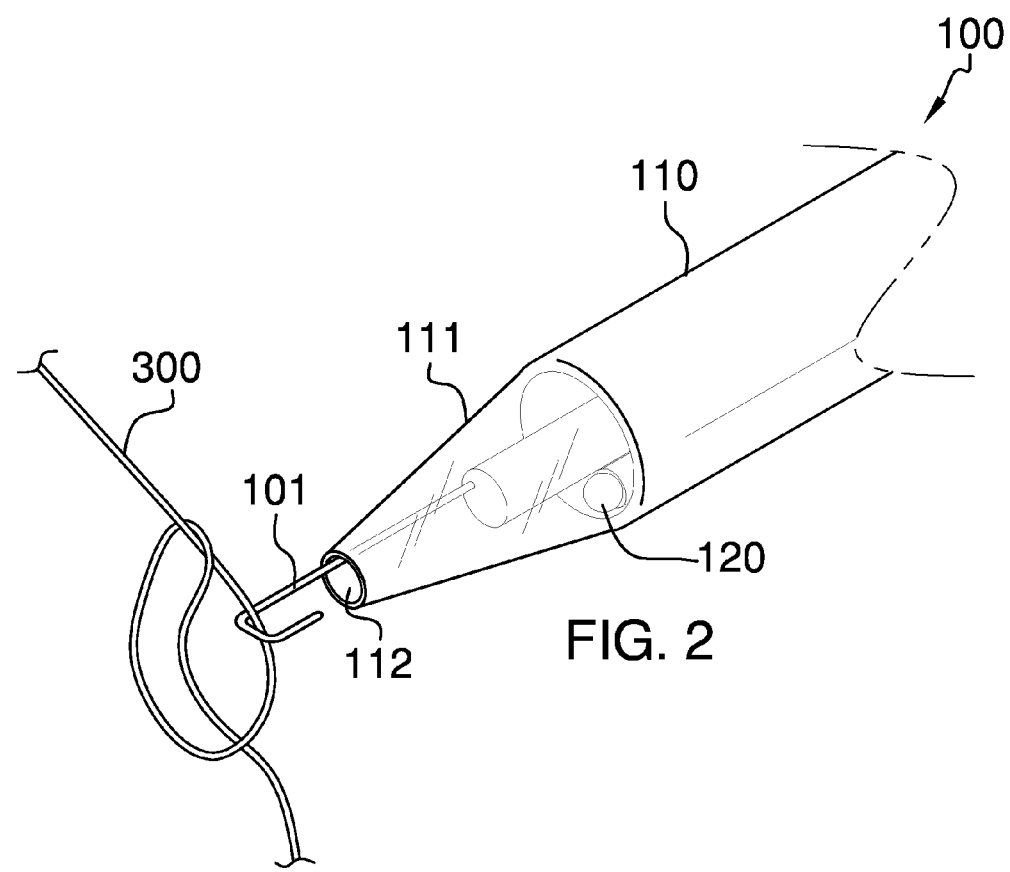
FIG. 2 illustrates a second perspective view that is a close up of the curled tip tool extended from the conical member.
Figure 3:
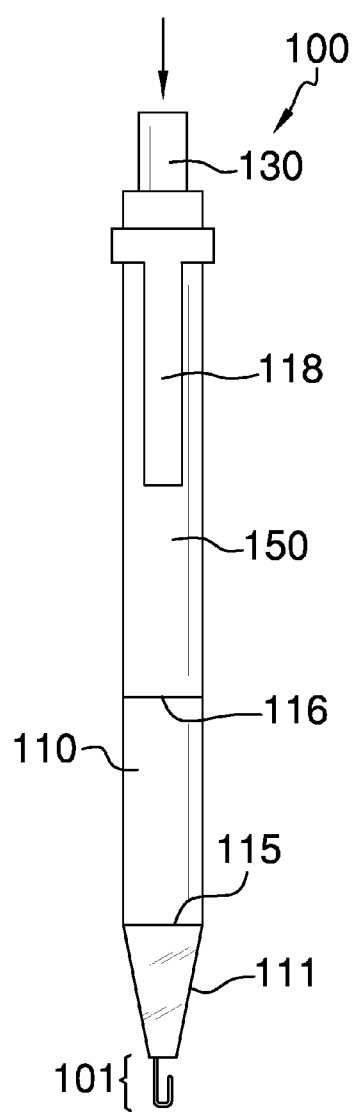
FIG. 3 illustrates a front view of the curled top tool extended upon depression of the button on the distal end of the shaft.
Figure 4:
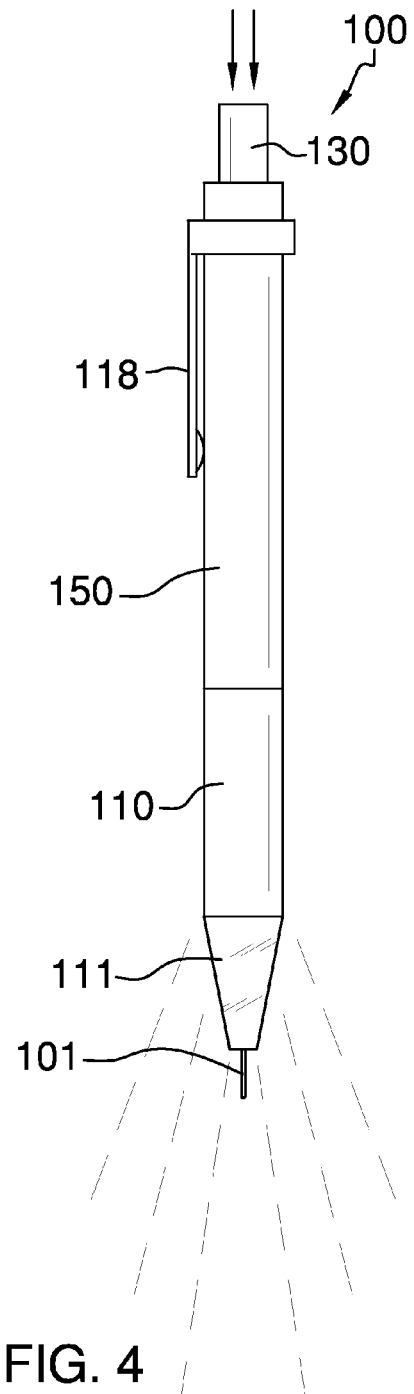
FIG. 4 illustrates a view of the lighting member being turned on upon depression of the button a second time.

Detailed reference will now be made to the preferred embodiment of the present invention, examples of which are illustrated in FIGS. 1-5. A spring-loaded curled tip hand tool for use in untangling fishing line 100 (hereinafter invention) includes a curled tip tool 101, which forms a "U" shape at a distal end, and which extends from and retracts into a shaft 110. The curled tip tool 101 is adapted for use with a fishing line 300. Moreover, the curled tip tool 101 is used to manipulate the fishing line 300 in order to untangle, or otherwise articulate the fishing line 300 as needed.

The shaft 110 is of an undefined length, and is a hollowed cylinder made of a material comprising a plastic, wood, or metal. The shaft includes a conical member 111 that is made of a clear material. The conical member 111 includes a light member 120 inside of the conical member 111. More specifically, the light member 120 is directed downwardly in order to direct light through the conical member 111 and onto the curled tip tool 101 when extended therefrom. It shall be noted that the conical member is of hollowed construction and features an opening 112, which enables the curled tip tool 101 the ability to extend and retract as needed.

The shaft 110 is further defined as including the conical member 111 at a first distal end 115. Additionally, the shaft 110 is further defined with a second distal end 116, which engages a base member 150. The base member 150 supports a button 130. The button 130 is biased via a spring member 140 that is inserted into the shaft 110. Moreover, the button 130 is depressed to extend the curled tip tool 101 via the opening 112 of the conical member 111. The button 130 is twice depressed in order to turn on the light member 120. Upon depressing the button 130 a third time, the light member 120 is turned off and the curled tip tool 101 is retracted back inside of the conical member 111.

The base member 150 may include a clip member 118 that is secured to an exterior surface of the base member 150, and works to clip the entire invention 100 onto an object, and in a manner consistent with use of a marker or pen.

Referring to FIG. 5, the curled tip tool 101 is affixed to and extends from the base member 150. The base member includes external threading 151 that secures the base member 150 to the shaft 110. Moreover, the spring member 140 is inserted into the interior of the shaft 110 where protruding members 160 engage a first spring end 141 of the spring member 140. A second spring end 142 rests against a light member housing 122 in order for the spring 140 to be engaged there between, and react upon depression of the button 130.

The light member housing 122 includes a pressure sensor 123 that interfaces with the second spring end 142 in order to detect when the button 130 has been depressed, and cycles through to turn on or off the light member 120. The light member 120 is positioned at a bottom portion of the light member housing 122 in order to direct light through the conical member 111.

It shall be noted that the base member 150 is rigidly affixed to the curling tip tool 101 via an intermediate member 170. The intermediate member 170 has a smaller outer diameter when compared to the base member 150. Moreover, the intermediate member 170 extends inside of the shaft 110. The protruding members 160 extend radially from the intermediate member 170.

The light member housing 122 is a cylindrically-shaped object that enables the curling tip tool 101 as well as a portion of the intermediate member 170 to pass there through. Moreover, the light member housing 122 includes the light member 120 as well as the pressure sensor 122.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A spring-loaded curled tip hand tool for use in untangling fishing line comprising:
    a curled tip tool that is adapted for use in untangling a fishing line;
    wherein the curled tip tool extends and retracts from a conical member that is affixed to a shaft;
    wherein a base member is rigidly affixed to the curled tip tool;
    wherein the base member includes a button, and is able to connect to the shaft;
    whereupon depression of the button shall extend or retract the curled tip tool from the conical member;
    wherein the curled tip tool forms a "U" shape at a distal end, and which extends from and retracts into the conical member and the shaft;
    wherein the shaft is of an undefined length, and is a hollowed cylinder;

wherein the conical member is made of a clear material, and includes a light member housing having a light member and a pressure sensor inside of the conical member;

wherein the light member is directed downwardly in order to direct light through the conical member and onto the curled tip tool when extended therefrom;

wherein the conical member is of hollowed construction and features an opening, which enables the curled tip tool the ability to extend and retract as needed;

wherein the shaft is further defined as including the conical member at a first distal end; wherein the shaft is further defined with a second distal end, which engages the base member;

wherein the base member supports the button, which is biased via a spring member that is inserted into the shaft.

2. The spring-loaded curled tip hand tool for use in untangling fishing line as described in claim 1 wherein the base member include a clip member that is secured to an exterior surface of the base member, and works to clip onto an object.

3. The spring-loaded curled tip hand tool for use in untangling fishing line as described in claim 2 wherein the base member includes external threading that secures the base member to the shaft; wherein the spring member is inserted into the interior of the shaft where protruding members engage a first spring end of the spring member; wherein a second spring end rests against the light member housing in order for the spring to be engaged there between, and react upon depression of the button.

4. The spring-loaded curled tip hand tool for use in untangling fishing line as described in claim 3 wherein the pressure sensor interfaces with the second spring end in order to detect when the button has been depressed.

5. The spring-loaded curled tip hand tool for use in untangling fishing line as described in claim 4 wherein the base member is rigidly affixed to the curling tip tool via an intermediate member; wherein the intermediate member extends inside of the shaft; wherein the protruding members extend radially from the intermediate member.

6. The spring-loaded curled tip hand tool for use in untangling fishing line as described in claim 5 wherein the light member housing is a cylindrically-shaped object that enables the curling tip tool as well as a portion of the intermediate member to pass there through.

7. A spring-loaded curled tip hand tool for use in untangling fishing line comprising:

a curled tip tool that is adapted for use in untangling a fishing line;

wherein the curled tip tool extends and retracts from a conical member that is affixed to a shaft;

wherein a base member is rigidly affixed to the curled tip tool;

wherein the base member includes a button, and is able to connect to the shaft;

whereupon depression of the button shall extend or retract the curled tip tool from the conical member; wherein the curled tip tool forms a "U" shape at a distal end, and which extends from and retracts into the conical member and the shaft; wherein the shaft is of an undefined length, and is a hollowed cylinder;

wherein the conical member is made of a clear material, and includes a light member housing having a light member and a pressure sensor inside of the conical member; wherein the light member is directed downwardly in order to direct light through the conical member and onto the curled tip tool when extended therefrom;

wherein the conical member is of hollowed construction and features an opening, which enables the curled tip tool the ability to extend and retract as needed; wherein the shaft is further defined as including the conical member at a first distal end; wherein the shaft is further defined with a second distal end, which engages the base member;

wherein the base member supports the button, which is biased via a spring member that is inserted into the shaft.

8. The spring-loaded curled tip hand tool for use in untangling fishing line as described in claim 7 wherein the base member include a clip member that is secured to an exterior surface of the base member, and works to clip onto an object; wherein the base member includes external threading that secures the base member to the shaft; wherein the spring member is inserted into the interior of the shaft where protruding members engage a first spring end of the spring member; wherein a second spring end rests against the light member housing in order for the spring to be engaged there between, and react upon depression of the button.

9. The spring-loaded curled tip hand tool for use in untangling fishing line as described in claim 8 wherein the pressure sensor interfaces with the second spring end in order to detect when the button has been depressed.

10. The spring-loaded curled tip hand tool for use in untangling fishing line as described in claim 9 wherein the base member is rigidly affixed to the curling tip tool via an intermediate member; wherein the intermediate member extends inside of the shaft; wherein the protruding members extend radially from the intermediate member; wherein the light member housing is a cylindrically-shaped object that enables the curling tip tool as well as a portion of the intermediate member to pass there through.

\* \* \* \* \*